(12) United States Patent
Mouchel et al.

(10) Patent No.: US 9,671,042 B2
(45) Date of Patent: Jun. 6, 2017

(54) ABANDONMENT AND RECOVERY SYSTEM (75) Inventors: Cédric Mouchel, Aberdeen (GB); René Maloberti, Champigny sur Maine (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 13/980,767

(22) PCT Filed: Mar. 5, 2012

(86) PCT No.: PCT/IB2012/000639
§ 371 (c)(1),
(2), (4) Date: Jul. 19, 2013

(87) PCT Pub. No.: WO2012/120381
PCT Pub. Date: Sep. 13, 2012

(65) Prior Publication Data
US 2013/0309018 A1 Nov. 21, 2013

(30) Foreign Application Priority Data
Mar. 7, 2011 (GB) .................................. 1103746.2

(51) Int. Cl.
*F16L 1/16* (2006.01)
*F16L 1/19* (2006.01)

(52) U.S. Cl.
CPC ................. *F16L 1/166* (2013.01); *F16L 1/16* (2013.01); *F16L 1/19* (2013.01)

(58) Field of Classification Search
USPC ................................................. 405/173, 158
See application file for complete search history.

(56) References Cited

U.S. PATENT DOCUMENTS

| 3,751,932 | A | 8/1973 | Matthews ...................... 61/72.1 |
| 3,842,612 | A | 10/1974 | Arnold |
| 5,421,674 | A | 6/1995 | Maloberti et al. |

FOREIGN PATENT DOCUMENTS

| AU | 494 892 B2 | 4/1977 |
| EP | 1 240 451 B | 10/2006 |
| EP | 1 467 944 B | 11/2006 |
| EP | 1 850 043 A2 | 10/2007 |
| FR | 2 455 234 A2 | 11/1980 |

(Continued)

OTHER PUBLICATIONS

United Kingdom Search Report, dated Jun. 13, 2013, issued in corresponding United Kingdom Application No. GB1103746.2. Total pp. 2.

(Continued)

*Primary Examiner* — Kyle Armstrong
(74) *Attorney, Agent, or Firm* — Ostrolenk Faber LLP (57) ABSTRACT

A method of abandoning a pipeline being laid by a pipelaying vessel, wherein said pipeline is being held by a lay tower comprising a pipelaying and tensioning arrangement, comprising at least the steps of: (a) linking the end of the pipeline (103) to a flexible tubular handling conduit (102); (b) separately linking the pipeline to a lifting wire (104); and (c) lowering the pipeline towards the sea floor. In this way, the present invention, using the load capacity of both a flexible tubular handling conduit and a lifting wire for at least some of the pipeline lowering, is able to operate either more safely at existing depths, or at even greater depths to an ocean floor than before, or both.

15 Claims, 7 Drawing Sheets

(56) References Cited

FOREIGN PATENT DOCUMENTS

| GB | 2 434 627 A | | 8/2007 |
|----|----|----|----|
| GB | 2434627 A | * | 8/2007 |
| GB | 2463286 A | * | 3/2010 |
| NL | 7 300 762 A | | 8/1973 |
| WO | WO 2009/002142 A1 | | 12/2008 |
| WO | WO 2010/081847 A1 | | 7/2010 |
| WO | WO 2011/048480 A1 | | 4/2011 |

OTHER PUBLICATIONS

International Preliminary Report on Patentability, dated Sep. 10, 2013, issued in corresponding PCT International Application No. PCT/IB2012/000639. Total pp. 5.
International Search Report dated Oct. 8, 2012 issued in corresponding International patent application No. PCT/IB2012/000639.

* cited by examiner

ABANDONMENT AND RECOVERY SYSTEM

CROSS REFERENCE TO RELATED APPLICATIONS

The present application is a 35 U.S.C. §371 National Phase conversion of PCT/IB2012/000639, filed Mar. 5, 2012, claiming the benefit of United Kingdom Application no. 1103746.2, filed Mar. 7, 2011, the disclosure of which is incorporated herein by reference. The PCT International Application was published in the English language.

TECHNICAL FIELD OF THE INVENTION

The present invention relates to an abandonment and recovery (A&R) system for an offshore pipeline, and in particular methods of abandoning and recovering such a pipeline, as well as to a pipeline laying vessel comprising such an A&R system.

BACKGROUND OF THE INVENTION

During the laying of an offshore pipeline, it is sometimes necessary to 'abandon' the pipeline and 'recover' it later. Often this is due to severe weather conditions. The pipelaying vessel may still be on-site, but for many reasons, it is best to locate the pipeline fully on the sea floor until pipelaying operations can start again by recovering the pipeline from the sea floor. This operation is commonly termed an 'abandonment and recovery system', frequently abbreviated to 'A&R system'.

Various A&R systems are known, starting with the use of cranes or winches, and lifting cables. For example, a lifting cable can be connected to the upper end of a pipeline and laid out until the whole length of the pipeline is safely on the sea floor. This is clearly the simplest operation for shallow depths. However, where the operation takes place in deeper water, for example (but not limited to) >1000 m, and increasingly at depths of up to 2000 m or even 3000 m, the length of the lifting cable becomes an important factor, as the weight of the cable itself becomes heavier. Thus, the load capacity of the lifting crane becomes a limiting factor as to how long a lifting cable can be used for this operation.

To overcome this, various methods have been proposed, and some used in the art. For example, EP1240451B suggests connecting one or more "light elongate members" to the end of the pipeline to reduce the tension at sea level of the 'sealine' before a winch is used to lower the sealine. In this way, it apparently becomes possible to employ a winch whose maximum load bearing capacity is substantially less than the maximum tension under which the vessel is designed to lay the pipeline.

EP1467944B proposes a lifting device involving first and second lifting structures which are open and closed at various times, and which allow the non-used part of a lifting cable to be stored in a non-tensioned manner on the vessel. In this way, EP1467944B particularly states that it is no longer necessary to employ an additional winch as an abandonment and recovery system.

WO2010/081847A1 discloses a method and apparatus for supporting a load involving a lifting block and associated first and second connection elements and first and second lifting devices able to act in unison to dispose the load at a required position from a floating vessel. The load could be for positioning an unlaid end portion of a pipe that is being laid on the sea floor or for recovering the end of a pipeline from the sea floor.

In our U.S. Pat. No. 5,421,674, we have proposed a device for laying flexible tubular conduits such as a pipeline on an ocean floor from a floating laying support such as a pipe laying vessel, the device comprising a recoverable flexible tubular handling conduit having sufficient mechanical strength to withstand a combined action of a highest internal pressure which said flexible tubular conduit to be laid will be subjected to, and an axial tensile force corresponding to an apparent weight in water of a length of said flexible tubular handling conduit which is suspended between said floating support and said ocean floor, and, to withstand isolated action of axial tensile force corresponding to an apparent weight in water of a length of said flexible tubular conduit to be laid suspended between said floating support and said ocean floor by said flexible conduit. The present invention is a surprising improvement of the invention described in U.S. Pat. No. 5,421,674.

SUMMARY OF THE INVENTION

Thus, according to one aspect of the present invention, there is provided a method of abandoning a pipeline being laid by a pipelaying vessel, wherein said pipeline is being held by a lay tower comprising a pipelaying and tensioning arrangement, comprising at least the steps of:
(a) linking the end of the pipeline to a flexible tubular handling conduit;
(b) separately linking the pipeline to a lifting wire; and
(c) lowering the pipeline towards the sea floor.

In this way, the present invention, using the load capacity of both a flexible tubular handling conduit and a lifting wire for at least some of the pipeline lowering, is able to operate either more safely at existing depths, or at even greater depths to an ocean floor than before, or both.

The pipeline being laid for the present invention can be any suitable pipeline, including but not limited to those for conveying one or more hydrocarbons or other pressurised or unpressurised fluids. Such pipelines include flexible pipelines, including those having an inner diameter equal to 101.6 mm (4 inches), 152.5 mm (6 inches), 228.6 mm (9 inches), 406.4 mm (16 inches) or 609.6 mm (24 inches).

Figure 1:
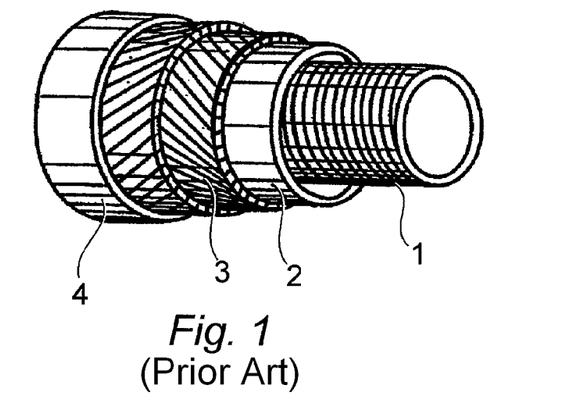
FIG. 1 is an exploded perspective view of a flexible tubular conduit of a known type.

FIG. 1 of the accompanying drawings herewith is an example of a pipeline being a flexible tubular conduit, and comprising an inner metal casing 1, surrounded by a plastic sheath 2, crossed reinforcement or armour layers 3, an adhesive strip (not shown) and a plastic sheath 4.

The laying of such pipelines in shallow waters can be carried out using the S-lay method. In deeper waters, the J-lay method is generally used in the art, and this is diagrammatically shown in FIG. 3 of the accompanying drawings herewith. A (generally long) pipeline, either coming in sections or in a complete length, is provided downwardly through a tower on a suitable pipe laying vessel, passing through one or more tensioners and clamps, etc., for feeding through the pipe laying vessel into the sea or ocean, to the sea floor or sea bed.

Pipelaying vessels having a lay tower are well known in the art. Generally, such vessels comprise a moonpool through which the pipeline passes to reach the sea.

Apparatus and methods for arranging to provide the pipeline from such a vessel, and for maintaining the required tension therein, are also well known in the art, and are within the term "pipelaying and tensioning arrangement" as used herein.

Our U.S. Pat. No. 5,421,674, incorporated herein by way of reference and in its entirety, describes using a flexible tubular handling conduit (hereinafter termed an 'A&R pipe')

to be connected mechanically to a flexible tubular conduit (hereinafter termed a 'pipeline') being laid, which A&R pipe has sufficient mechanical strength to withstand high internal pressures and axial tensile forces, whilst it is shaped so that no modification of the tensioning means in the lay tower in required.

Methods and apparatus for linking pipelines, conduits and lifting wires are well known in the art, and can include grommets, slings, pennants, shackles, master links, pear links, ROV releasable shackles and hooks, and combinations thereof.

In the present invention, such a flexible tubular conduit can be linked to the pipeline on the vessel, either directly or indirectly. U.S. Pat. No. 5,421,674 describes methods of connecting an A&R pipe to a pipeline generally using various attachment devices. Such attachment devices could comprise an end fitting mounted at the end of the pipeline, optionally comprising various mechanical connections and a disconnecting device.

Preferably, the A&R pipe is connected to the end of the pipeline indirectly, and more preferably via an intermediate device including, but not limited to one or more of the group comprising: plates, blocks, grommets, slings, pennants, triplate, lifting beam, spreader bar/beam, and combinations thereof.

In one embodiment of the present invention, the intermediate device is a triplate comprising at least one linkage between the triplate and the A&R pipe, and at least one linkage between the triplate and the pipeline.

In another embodiment of the present invention, the intermediate device is a block comprising at least one linkage to the A&R pipe, the lifting wire, and the pipeline. One or more of such linkages may overlap or be shared, whilst maintaining the ability to separately link and unlink each of the A&R pipe and lifting wire to the pipeline.

The terms "linkage" or "linking" as used herein are not limited to the provision of a fixed or otherwise permanent coupling between two elements requiring positive uncoupling actions to unlink, but include any combination of the elements which allows a load to be passed therethough in a sufficiently secure way to allow the raising and lowering of the pipeline.

The lifting wire may be any form of wire, line, cable or similar member, able to assist with lifting or lowering the pipeline relative to the vessel. Steel cables are well known in the art, and are usually preferred at shallow water depths. However, their weight becomes an increasing problem with increasing length of such cables, as well as requiring an increasing amount of storage space when not in use. Synthetic cables are also known. They weigh less than steel cables, but their sole use for lowering and lifting at significant depths is generally avoided in view of possible slippage and frictional damage.

In one embodiment of the present invention, the lifting wire is for lowering and/or lifting the pipeline for a section of the travel of the (end of the) pipeline between the vessel and the sea floor, in particular the section of such travel involving the greatest load or strain, usually being the first part of the lowering of the pipeline from the vessel to the sea floor.

The lifting wire may be provided from a suitable lifting mechanism, such as a winch or crane, and the length of the lifting wire may be the same as, longer, or shorter than that of the A&R pipe. Preferably, the lifting wire is shorter than the A&R pipe.

According to another embodiment of the present invention the lifting wire is provided in parallel with the vertical axis or major passageway of the lay tower, generally also being the axis and passageway of the pipeline and tensioning arrangement, so that the lifting wire and A&R pipe are provided wholly or substantially in parallel in use from the vessel.

According to a further embodiment of the present invention, the lifting wire passes at least partly through the lay tower. This can provide the lifting wire being parallel with the vertical axis or major passageway of the lay tower, especially at the lowest point thereof where the lifting wire and pipeline leave the lay tower and leave the support provided thereby.

The lifting wire may be connected directly or indirectly to the pipeline. Preferably, the lifting wire is connected indirectly via an intermediate device. More preferably, the intermediate device is a triplate, having one or more linkages for a lifting wire, and one or more linkages for the pipeline.

Wire suitable for lifting is generally in the form of a rope or the like formed from a plurality of stands or fibres, usually twisted or layered.

The term "lifting wire" as used herein includes a single wire or cable, or multiple wires, being the same or different and being in-line with one or more other wires, or a number of separate lifting wires, or a combination thereof.

Thus, for example the lifting wire may be a single- or multi-strand wire extending from a single winch or other provider, with an attachment at one end for linking with the pipeline.

Alternatively, the lifting wire comprises a double-, triple-, etc. fall wire passing through one or more end blocks, such as a pulley or snatch block, generally having one or more pulley wheels, to divide the load therebetween, but still having a single linkage at the end.

Alternatively, the lifting wire comprises two separate lifting wires, generally acting in concert, to link with the pipeline either independently or through a common linkage mechanism or assembly.

The present invention preferably provides an intermediate device having a linkage for an A&R pipe, a linkage for a lifting wire, and a linkage for a pipeline. Such linkages may involve one or more intermediate devices such as end fittings, pins, shackles, and the like.

According to another embodiment of the present invention, the linking of the A&R pipe and the lifting wire to the pipeline is not symmetrical. Preferably, where an intermediate device is used, the linkages of the intermediate device to the A&R pipe and to the lifting wire are off set relative to the pipeline linkage. More particularly, where the intermediate device is a triplate, it is preferably an offset triplate.

Preferably, such linkages (of the intermediate device to the A&R pipe and to the lifting wire) are off set relative to the pipeline linkage because the capacity of the A&R pipe and the lifting wire are different, so that the balance of the intermediate device is preserved. That is, the intermediate device remains horizontal during use, and the load repartition between the A&R pipe and the lifting wire is wholly or substantially maintained.

Based on the same beneficial features and advantages as discussed above, according to a second aspect of the present invention, there is provided a method of recovering an abandoned pipeline on a sea floor to a pipelaying vessel, said pipeline being linked to a flexible tubular conduit, comprising at least the steps of:

(i) raising the flexible tubular conduit and linked pipeline;
(ii) separately linking the pipeline to a lifting wire; and
(iii) raising the pipeline to the pipelaying vessel.

Optionally, step (ii) is carried out prior to step (i), i.e. the lifting wire is attached to the pipeline prior to any raising operation, and assists with the recovery of the pipeline all the way to the pipelaying vessel.

Alternatively, step (ii) is carried out prior to the pipeline reaching the pipelaying vessel, i.e. at an intermediate point of the raising of the pipeline, especially prior to that section of travel involving the greatest load or strain.

Optionally, the method of recovery involves the flexible tubular conduit and the lifting wire being linked to the pipeline via an intermediate device, such as described hereinbefore. Preferably, the intermediate device is a triplate, more preferably an offset triplate.

According to one embodiment of the method of recovery of the present invention, the flexible tubular conduit and linked pipeline are raised to the pipelaying vessel using a lay tower comprising a pipelifting arrangement, and the lifting wire is wholly or substantially parallel to the vertical axis of the pipelifting arrangement, or the lifting wire passes at least partly through the lay tower, or both.

The pipelifting arrangement may be the same as or different to the pipelaying and tensioning arrangement used in the method of abandoning a pipeline to be laid by a pipelaying vessel described hereinbefore.

According to a third aspect of the present invention, there is provided an abandonment and recovery (A&R) system comprising a method of abandoning a pipeline as defined herein above and a method of recovering a pipeline as defined herein above.

According to another aspect of the present invention, there is provided a pipeline laying vessel comprising an A&R system as defined herein above.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

BRIEF DESCRIPTION OF THE DRAWINGS

Preferred embodiments of the present invention will now be described, by way of example only, and with reference to the accompanying drawings, in which:—

DESCRIPTION OF PREFERRED EMBODIMENTS

Referring to the drawings, FIG. 1 shows an example of a flexible tubular conduit, generally being a pipeline, for the passage of hydrocarbon fluid such as oil or gas, known in the art. As mentioned hereinbefore, it comprises an inner metal casing 1, surrounded by a plastic sheath 2, cross reinforcement or armour layers 3, an adhesive strip (not shown) and a plastic sheath 4.

Many forms of pipelines and flexible tubular conduits able to convey hydrocarbons are known in the art, having various parameters and variables including the number, type, thicknesses and format of layers, for the same or other purposes. The skilled man is aware of variations possible in such pipelines, especially those intended for increasing depths beyond 1000 m.

Figure 2:
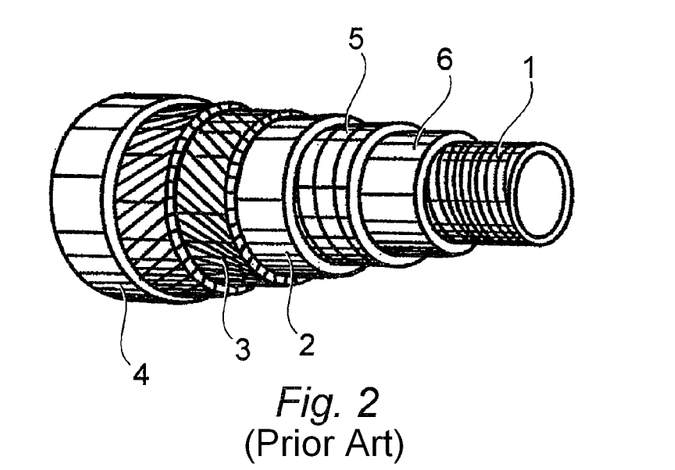
FIG. 2 is an exploded perspective view of a flexible tubular handling conduit of a known type.

FIG. 2 shows a flexible tubular conduit or A&R pipe known in the art, and described in detail in our U.S. Pat. No. 5,421,674. The A&R pipe in FIG. 2 has, in a similar manner to that of FIG. 1, an inner metal casing 1, a plastic sheath 6, a vault 5, to withstand pressure, a plastic sheath 2, a reinforcement unit 3, and an outer plastic sheath 4. By way of example only, for use at 1000 m of depth with a maximum internal working pressure in the order of 280 bar (4000 psi), the inner casing could have a thickness of approximately 7.2 mm, the plastic sheath 6 an approximate thickness of 4.2 mm, and the pressure vault 5 a thickness of 6.2 mm. The reinforcement unit 3 could comprise at least one pair of reinforcement layers in optionally different directions. The structure of the reinforcement layers, as well as the adhesive strips, have not been shown in detail in FIG. 2. To withstand tensile forces, it is possible, for example, to double the number of crossed reinforcements shown in FIG. 2 or to increase the thickness of the cross reinforcements.

The skilled man is aware of possible variations in the number, type, thicknesses and format of layers in the A&R pipe, as long as it has sufficient mechanical strength to withstand the combined action of the highest internal pressure which the pipeline of FIG. 1 will be subjected, as well as able to withstand an axial tensile force corresponding to an apparent weight in water of the length of the A&R pipe suspended between the relevant ship or vessel and the sea floor, and be able to withstand the isolated action of the axial tensile force corresponding to the apparent weight in water of the length of the A&R pipe to be laid suspended between the vessel and the ocean floor by the pipeline.

Discussion of possible loads and suitable parameters concerning the type and thicknesses of some of these layers are discussed in U.S. Pat. No. 5,421,674, and are not further discussed herewith. However, it is appreciated that the "great depths" discussed in U.S. Pat. No. 5,421,674 are in "the order of 1000 m". Advances in technology since U.S. Pat. No. 5,421,674 mean that sea depths much greater than 1000 m are now being explored, such that abandonment and recovery operations are now being carried out at much greater depths than 1000 m.

Figure 3:
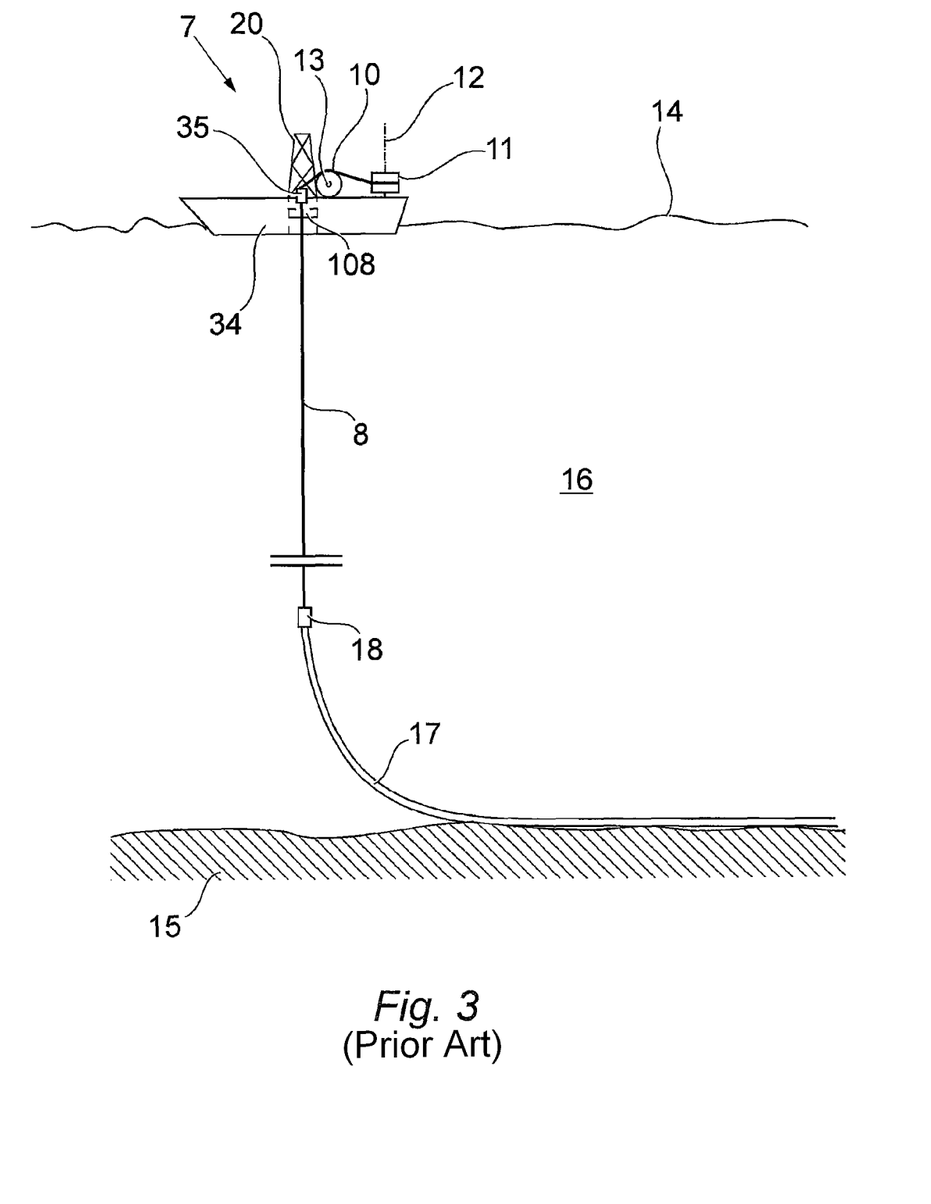
FIG. 3 is a schematic diagram of an abandonment operation of known type.

FIG. 3 shows a pipe laying vessel such as a ship 7 having a lay tower 20 on a sea or ocean 16, having a sea level 14 and a sea bed or sea floor 15. Starting from the sea floor 15, there is shown a flexible tubular conduit or pipeline 17 to be recovered or abandoned, an end fitting 18, and an A&R pipe 8 leading up to a winch 35 through an opening 34 in the ship 7. The winch has a guide wheel 10 with horizontal axis 13, and a storage cage 11 with a vertical axle 12.

Following the attachment of the A&R pipe 8 to the pipeline 17 via the end fitting 18, and for an abandonment operation, the pipeline 17 and A&R pipe 8 can be lowered to the sea floor 15 and the winch can make it possible to put a load in motion by applying a force to the A&R pipe 8 on the vessel 7.

Such operations are reversed for the recovery of the pipeline 17 from the sea floor 15.

Figure 4A:
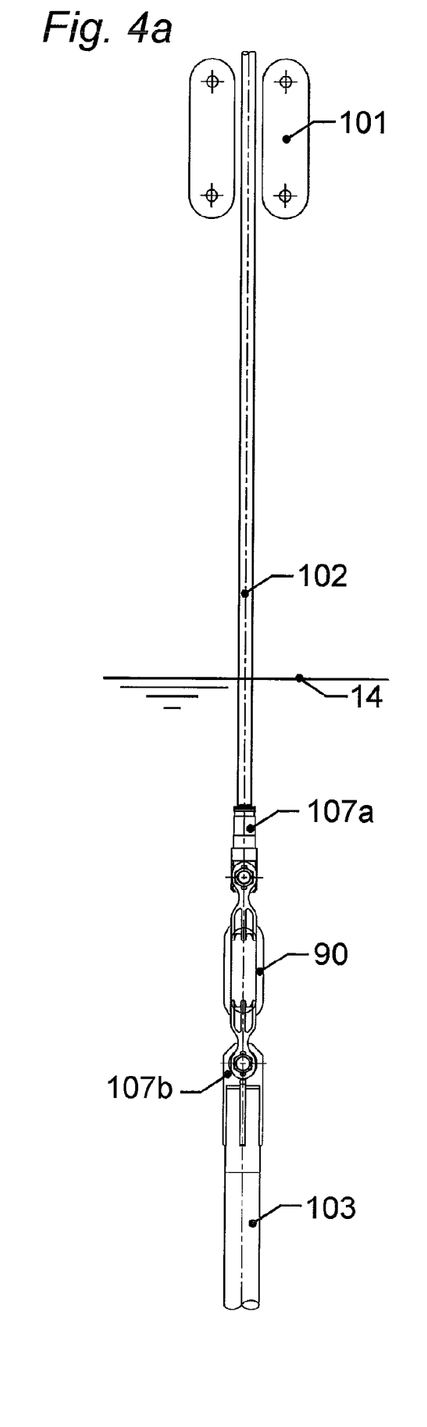
FIG. 4a shows a first schematic diagram of a connection between a pipeline and an A&R pipe.

FIG. 4a shows in more detail another pipeline 103 and another A&R pipe 102. The A&R pipe 102 is linked to the pipeline 103 through a link assembly 90, able to suitably link (generally by the use of eyes and pins) via end fittings 107a and 107b to the A&R pipe 102, and to the pipeline 103 in a manner known in the art.

To maintain a tension in the pipeline 103, the A&R pipe 102 passes through the pipeline and tensioning arrangement in the pipe laying vessel such as the ship 7 shown in FIG. 3. FIGS. 4a-4f do not show the full pipeline and tensioning arrangement used to lay the pipeline 103, but do show as a representation two tracks 101 comprising one set of tensioners in the lay tower 20. The skilled man is aware that there are further clamps and tensioners in a lay tower, but a further description thereof is not required to illustrate the present invention where it is intended that the A&R pipe 102 is shaped and sized so as to be suitable for being held and tensioned by the pipe laying and tensioning arrangement in the same way as the pipeline 103 is held and tensioned during the normal pipe laying operation.

FIG. 4a is an illustration of the process for handling a flexible tubular conduit according to U.S. Pat. No. 5,421,674.

Figure 4B:
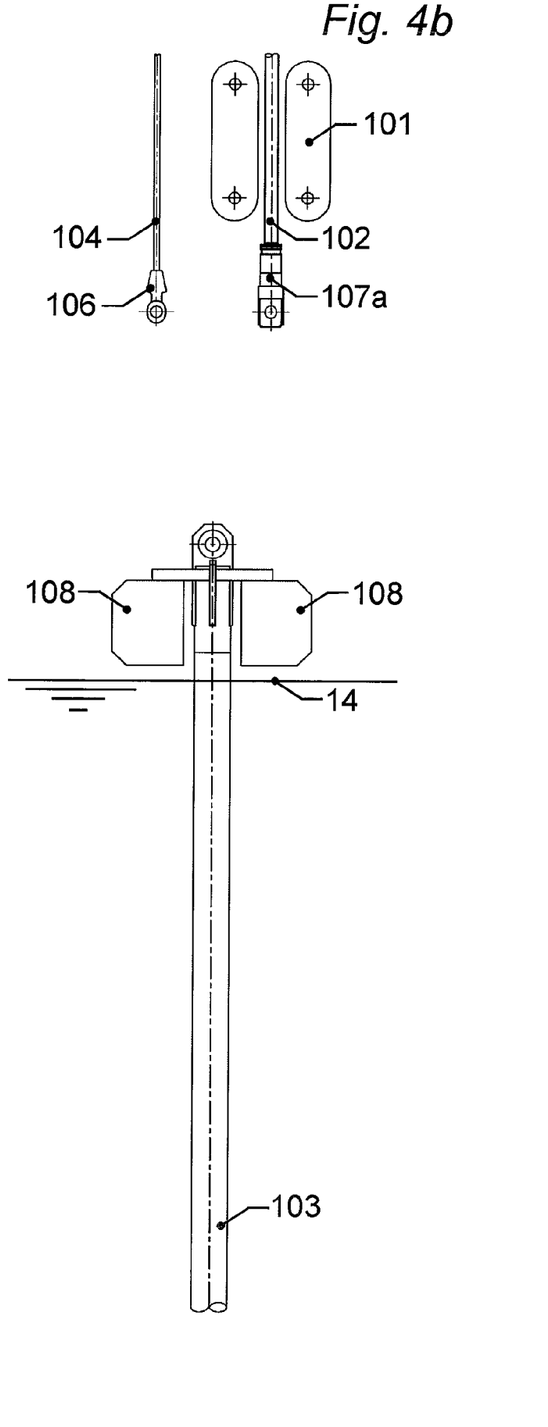
FIGS. 4b-4f are a series of five schematic drawings of a method of abandoning a pipeline according to one embodiment of the present invention.

FIG. 4b shows an embodiment of the present invention able to provide a method of abandoning the pipeline 103 previously being laid by a pipe laying vessel such as the ship 7 shown in FIG. 3, wherein said pipeline 103 is being held in a lay tower such as the lay tower 20 also shown in FIG. 3, said lay tower comprising a pipe laying and tensioning arrangement. In FIG. 4b, there is shown a clamp, such as a hang off clamp 108, on the ship 7. Hang off clamps are well known in the art and are not further described herein.

FIG. 4b also shows the tracks 101, and the already placed A&R pipe 102 therein, having a suitable end fitting 107a.

FIG. 4b also shows a lifting wire being a steel cable 104, having a suitable cable end fitting 106.

Figure 4C:
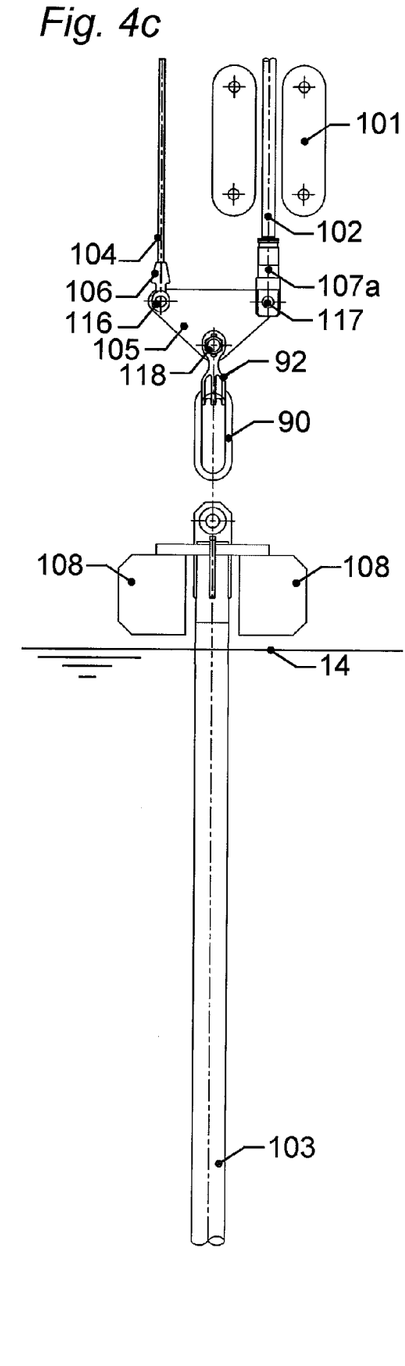

FIG. 4c shows the introduction of a suitable intermediate device, being a first triplate 105. The first triplate 105 comprises a first aperture 117 able to be aligned with corresponding apertures in the A&R pipe end fitting 107a, to allow a pin or the like to be passed therethrough. In this way, it is possible to link the end of the flexible tubular handling conduit, being the A&R pipe 102, with the first triplate 105.

Similarly, the first triplate 105 has a second aperture 116 able to be aligned with a corresponding aperture in the cable end fitting 106, for the provision of a suitable pin or like, to allow separate linking of the lifting cable 104 with the first triplate 105.

The first triplate 105 has a third suitable aperture 118 at a lower location for linking in a suitable way with an end fitting 92 of the linkage assembly 90.

Figure 4D:
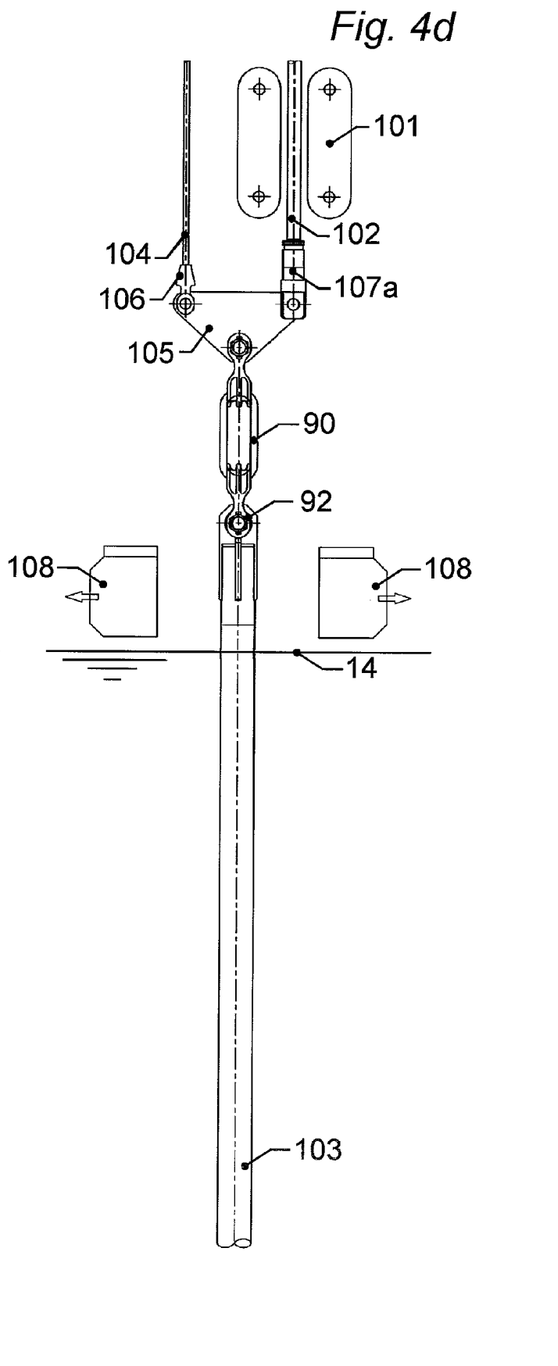

FIG. 4d shows the linking of another suitable end fitting 92, optionally being the same or similar to end fitting 107b described above, between the linking assembly 90 and the end of the pipeline 103. In this way, there is provided:
(a) linking the end of the pipeline to a flexible tubular handling conduit; and
(b) separately linking the pipeline to a lifting wire.

FIG. 4d shows that the linking of the pipeline, flexible tubular handling conduit and the lifting wire is indirect, i.e. via the triplate 105.

FIG. 4d also shows that once the linking as described above has been carried out, the hang off clamp 108 can be released so that tension in the pipeline 103 is now provided by the A&R pipe 102 being held in the pipeline and tensioning arrangement (represented by the tracks 101) and by the lifting cable 104.

Figure 4E:
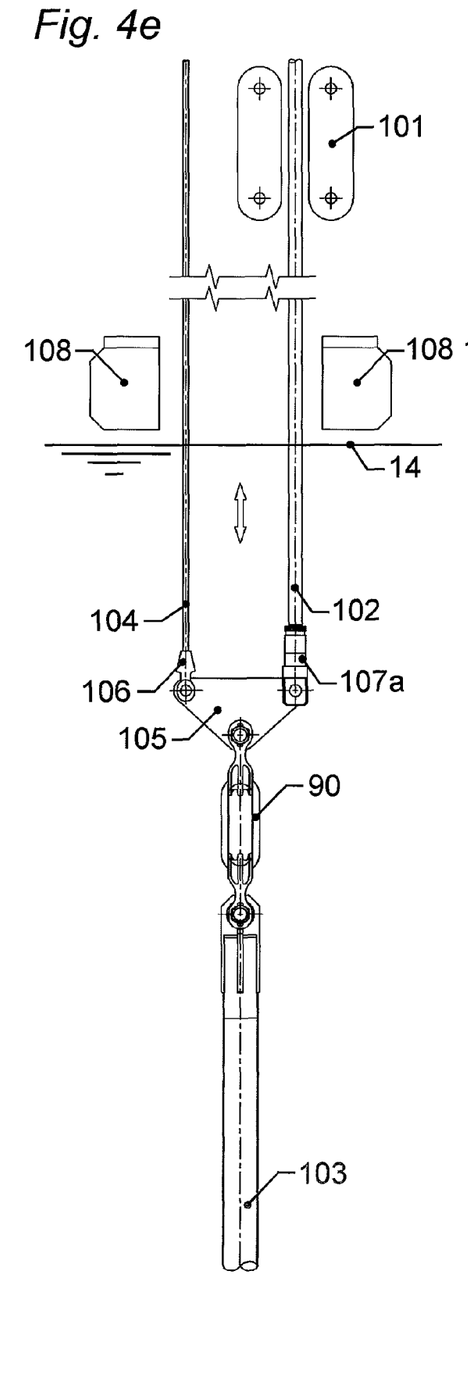

FIG. 4e shows the lowering of the pipeline 103, generally towards the sea floor such as that shown in FIG. 3, by operation of the pipe laying and tensioning arrangement and by letting out of the lifting cable 104.

Figure 4F:
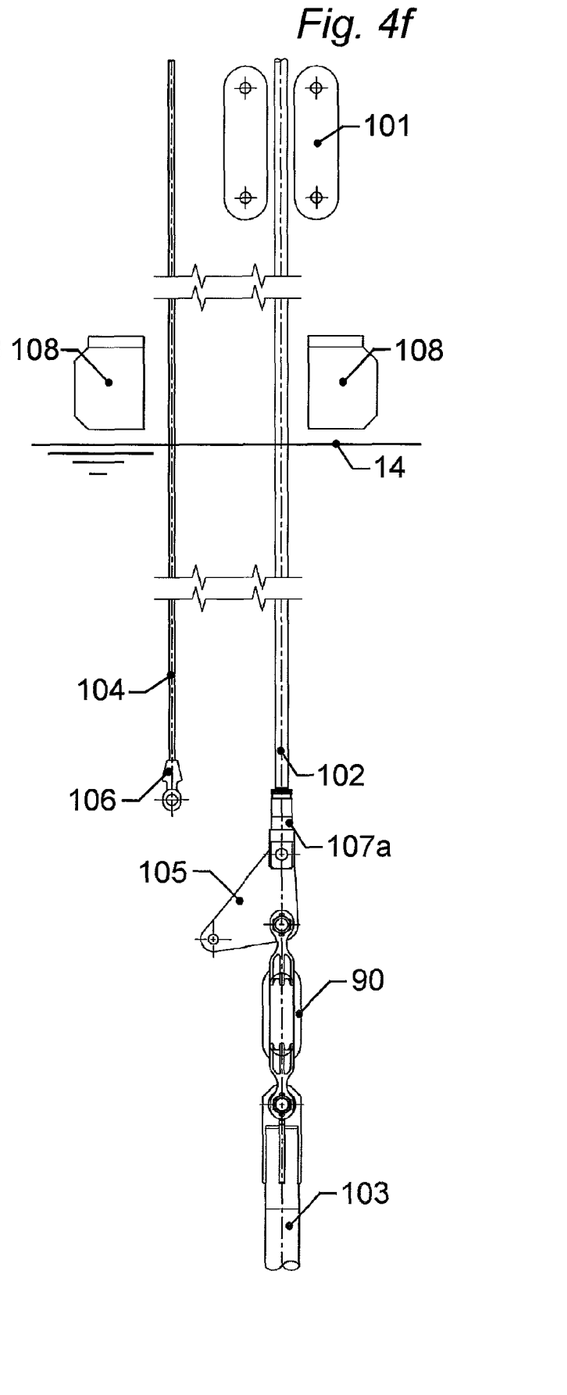

At a suitable depth of lowering, FIG. 4f shows the unlinking of the lifting cable 104 from the first triplate 105. The unlinking can be performed by a suitable ROV as discussed hereinafter. Tension in the pipeline 103 is still continually provided by the A&R pipe 102 held by the pipe laying and tensioning arrangement as represented by the tracks 101, and the pipeline 103 can now be further lowered so that it fully reaches the sea floor 15 in a manner known in the art.

In this way, the pipeline 103 has been abandoned as understood in the art. There may be continuing holding of the A&R pipe 102 by the vessel such as a ship 7, or the abandonment also of the A&R pipe 102 (to allow the vessel to depart from the site), and such further operations and considerations are well known in the art.

Figure 5:
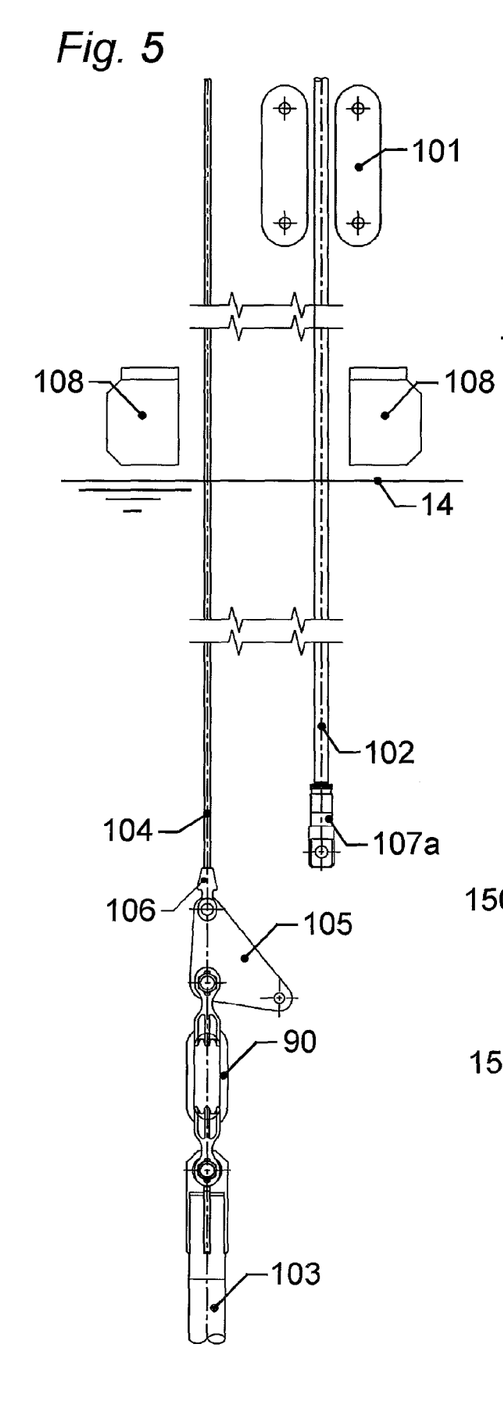
FIG. 5 is an alternative embodiment of FIG. 4f.

FIG. 5 shows an alternative arrangement wherein following the lowering of the pipeline 103 in FIG. 4e, it is possible to unlink the A&R pipe 102 from the first triplate 105, rather than the lifting cable 104. Thus, subsequent lowering of the pipeline 103 is carried out by further extension of the lifting cable 104 towards the sea floor, rather than the A&R pipe 102.

Figure 6:
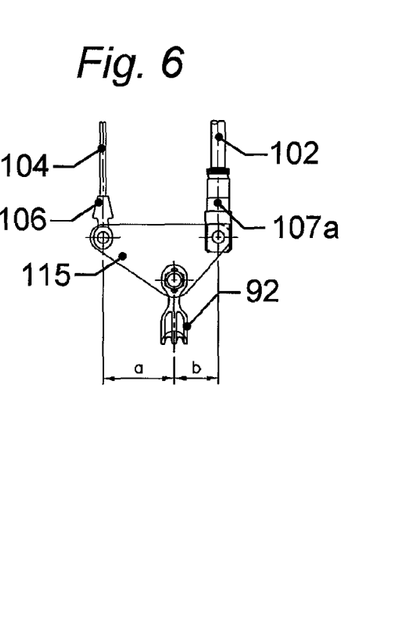
FIG. 6 is an alternative triplate arrangement for use with the present invention.

FIG. 6 shows a second triplate 115 wherein the location of suitable apertures for the linking with an A&R pipe end fitting 107a and a lifting cable end fitting 106, are not symmetrical with respect to the location of a suitable aperture for the linking of the pipeline 103 via its end fitting 92. FIG. 6 shows this as the distances "a" and "b" being different.

The skilled man is aware that various possible configurations of the apertures in a triplate may be possible in order to best achieve intended loading and strain through the triplate according to the expected operations required, in particular the nature of the sea involved, especially its depth, and the nature of the pipeline and/or the A&R pipe. Thus, variation, not only in the location of the apertures around the triplate, but also the shape of the triplate, are within the scope of the present invention based on operational parameters for each particular pipe laying operation. In particular, as the expected or desired load repartition between the A&R pipe and the lifting wire can be different, the ratio of "a" and "b" can be dimensioned so that the triplate tends to be or stays horizontal when in correct or desired reparation or load balance.

FIGS. 4b-4f and FIG. 5 show the lifting cable 104 being wholly or substantially parallel to the vertical axis of the pipe laying and tensioning arrangement, as represented by the tracks 101. This allows for better understanding and control of the load sharing of the lifting cable 104 and A&R pipe 102 by users.

In a generally reverse operation to that described above, FIGS. 4b-4f, (or with the alternative shown in FIG. 5), also show an embodiment of the present invention being a method of recovering an abandoned pipeline such as pipeline 103 on a sea floor such as sea floor 15, to a pipe laying vessel such as ship 7. The pipeline 103, still being linked to the flexible tubular conduit being the A&R pipe 102, allows the raising of both the A&R pipe 102 and the pipeline 103 to a suitable depth as described hereinafter, and as shown by way of example in FIG. 4f. At that depth, the lifting cable 104 can be lowered so as to be in the location of the first triplate 105, to allow linking with the triplate 105 using a suitable ROV.

Thereafter, lifting of the pipeline 103 can be achieved by the combination of the lifting cable 104 and the A&R pipe 102 upwardly, as shown by the order of FIGS. 4e and 4d, followed by clamping of the hang off clamp 108 around the end of the pipeline 103, and unlinking of the linking mechanism 90 as shown in FIG. 4c. Thereafter, the lifting cable 104 and the A&R pipe 102 can be unlinked from the first triplate 105, followed by storage of the lifting cable 104, removal of the A&R pipe 102 from the pipe laying and tensioning arrangement, and reintroduction of further pipeline or sections of pipeline through the pipe laying and tensioning arrangement onto the free end of the pipeline 103 as held by the hang off clamp 108.

In an alternative embodiment, the A&R pipe and the lifting wire are linked to the pipeline from the start of recovery process.

Figure 7:
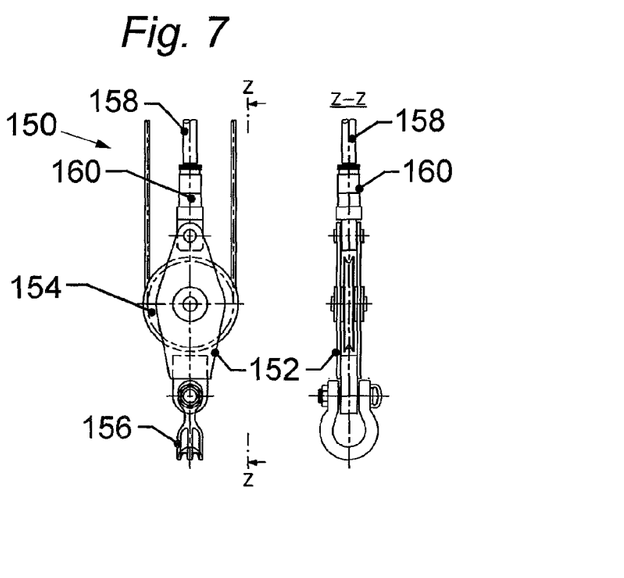
FIG. 7 is an alternative lifting rope embodiment.

FIG. 7 shows, with front and ZZ side views, the final part of another lifting wire and A&R pipe, in combination. FIG. 7 shows a double-fall wire 150 passing through a snatch block 152 having a pulley wheel 154, to divide the load between the two part so the wire 150, with a single lower linkage 156 at the end can be attached to a pipeline, (not shown). Also attached to the snatch block 152 is an A&R pipe 158 via an end fitting 160. Removal or withdrawal of the wire 150 from the snatch block 152 at a suitable depth allows continuing use of the A&R pipe 158 to raise and lower the pipeline, and vice versa. Each of the wire 150 and A&R pipe 158 can still be independently or separately linked with or unlinked from the snatch block 152 and hence the pipeline, whilst being wholly or substantially parallel.

Figure 8A:
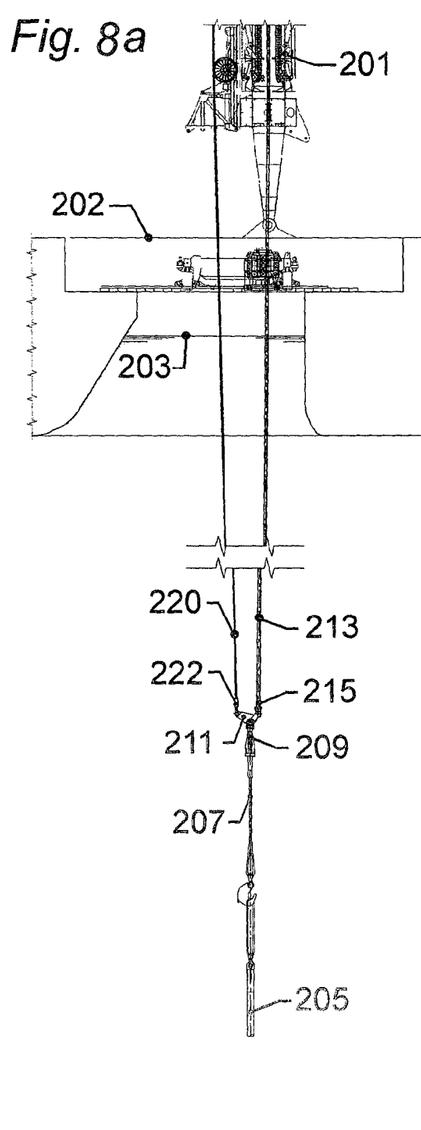
FIGS. 8a and 8b are two views of another method of abandoning a pipeline according to another embodiment of the present invention.

FIG. 8a shows another view of part of a method of abandoning a pipeline similar to that shown in FIGS. 4e and 4f.

In FIG. 8a, there is shown the bottom of a pipe laying and tensioning apparatus 201 located on a suitable vessel 202 having a moon pool 203.

A pipeline 205 being abandoned has a linking assembly 207 having an end fitting 209 connecting to a triplate 211. By way of example, the top tension on the end fitting 209 could be between 500-1000 tonnes, such as a maximum of 850 tonnes at the beginning of the operation, i.e. where the pipeline 205 is at its highest and still in the hang off clamp (not shown) in the vessel 202 prior to any lowering into the sea.

Also linked to the triplate 211 is an A&R pipe 213, having an end fitting 215. At the top tension as described above, it is preferred for the A&R pipe to take greater than 50% of the load, possibly even greater than 60% of the load. The A&R pipe 213 is tensioned by the arrangement 201 on the vessel 202.

FIG. 8a also shows a lifting cable 220 running substantially parallel to the A&R pipe 213, and having an end fitting 222 for linking the wire 220 to the triplate 211.

FIG. 8a shows the lifting wire 220 passing at least partially through the lay tower (not fully shown but including the pipe laying and tensioning apparatus 201). The load taken by the lifting wire 202 will be the remainder of that not taken by the A&R pipe 213, such as less than 50%, optionally less than 40%, at top tension.

Figure 8B:
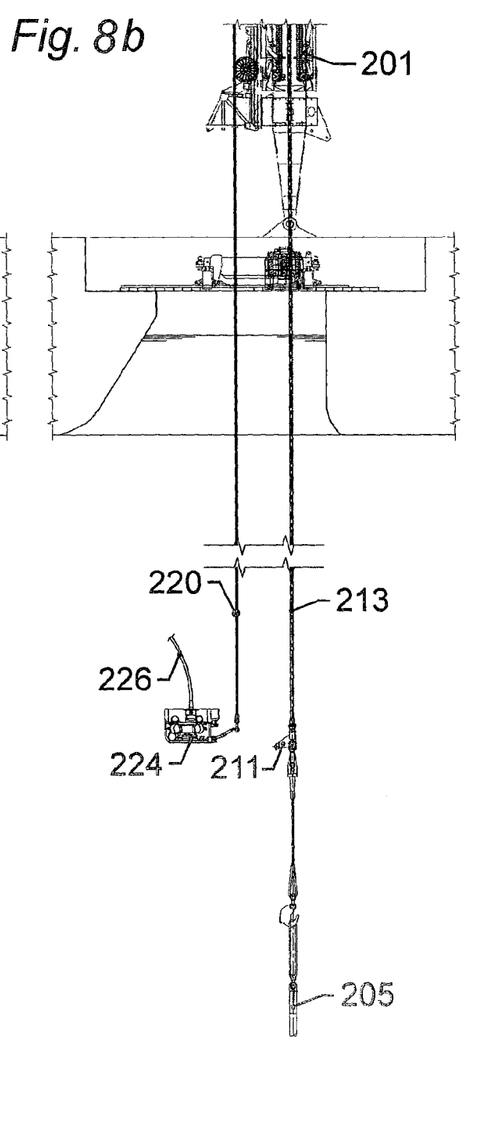

FIG. 8b shows a remotely operated vehicle (ROV) 224 having an umbilical 226, for connection and disconnection of the lifting wire 220 to the triplate 211. That is, during a method of abandoning a pipeline 205, the ROV 224 could disconnect the lifting wire 220 following the extent of the lowering of the pipeline 205 through its top tension and greatest tension period. This is usually as the end of the pipeline 205 is being lowered from the vessel 202, and so having the maximum weight in, and suspended by, the sea. As the pipeline 205 is increasingly laid on the sea floor (not shown in FIGS. 8a and 8b), the overall load is reduced, such that less load carrying capacity is required to continue to lower the pipeline 205. Hence, there is a depth at which further lowering of the pipeline 205 can be achieved purely through the A&R pipe 213 and the tensioning thereof by the pipe laying and tensioning arrangement 201.

The reverse arrangement of that shown in FIGS. 8a and 8b can be used for the final part of lifting the pipeline 205 in a method of recovering the pipeline 205 from the sea floor. That is, at a suitable depth (following raising of the pipeline 205 using the A&R pipe 213 running through the pipe laying and tensioning arrangement 201), an ROV 224 can be used to link the lifting wire 220 to the triplate 211, thereby to indirectly link the lifting wire 220 to the pipeline 205, for the further lifting of the pipeline 205 to the vessel 202, during the period of maximum tension and load.

The present invention is also able to consider a defined load repartition between the lifting cable 220 and the A&R pipe 213 during the period of abandonment and recovery when both are in use or both are required. This load repartition maintains or preserves the general balance of the triplate and the A&R system.

For example, the A&R pipe could run in a master mode when the lifting mechanism for the lifting cable is in a slave mode. Thus, the A&R system could be laid down by the tensioners in the pipelaying arrangement, which control the speed of laying of the pipeline on the sea floor. The tension on the A&R pipe could be continuously monitored with tensioner load cells. The required tension for the lifting cable can then be calculated according to the desired or preferred ratio thereinbetween, and such required tension could be communicated to a lifting mechanism to provide the right amount of overall tension for the pipeline. This ensures stability of the system.

The depth at which the unlinking of the lifting cable, (or alternatively the unlinking of the A&R pipe), from the pipeline during the method of abandonment, and/or the opposite linking of the linking wire (or the A&R pipe) to the pipeline during recovery of the pipeline, will be based on a number of parameters, including but not limited to: overall depth of the sea from the vessel to the sea floor, the weight, type and nature of the pipeline, the weight, type and nature of the A&R pipe, the weight, type and nature of the lifting cable and winch. It may also depend on whether the pipeline is flooded or empty.

By way of example only, for a 14"×34 wt pipe and a 3000 m water depth, the dynamic top tension (flooded) at sea level is approximately 845 Te. A lifting wire and winch assisting the A&R pipe would therefore be required to provide a contribution of approximately 295 Te initially. The approximate lowering device line out required to laydown is approximately 3400 m.

At about 1800 m water depth, the tension has decayed sufficiently that the lifting wire can be disconnected and the A&R pipe can continue with the abandonment operation unaided. The peak pipeline tension component has decayed to approximately 338 Te. The total mass of pipe follower suspended (also flooded) is approximately 217 Te, so the total load suspended by the tensioners would be approximately 555 Te.

The present invention provides a method of abandonment and a method of recovery wherein the load capacity of both a flexible tubular handling conduit and a lifting wire for at least some of the pipeline lowering or raising, is able to operate either more safely at existing depths, or at even greater depths to an ocean floor than before, or both. Where the operation takes place in deep water, being >1000 m, and increasingly at depths of up to 2000 m or even 3000 m, the length and weight of the lifting cable become important factors. Additional use of the load capacity of a lifting wire at least during the period of greatest load and tension, usually where the pipeline is still close to the vessel, can overcome the limiting factor as to how deep a lifting cable on its own can be used for this operation.

The use of an offset triplate and master-slave load calculation and monitoring further allow the very close control of the load repartition during the (usually) most critical period of lowering and raising the pipeline, i.e. on and off the vessel, and close to the vessel.

What is claimed is:

1. A method of abandoning a pipeline being laid by a pipelaying vessel, wherein said pipeline is being held by a lay tower comprising a pipelaying and tensioning arrangement, comprising at least the steps of:
   (a) linking the end of the pipeline to a flexible tubular handling conduit;
   (b) separately linking the pipeline to a lifting wire; and
   (c) lowering the pipeline towards the sea floor,
   wherein the weight of the pipeline is supported by both the flexible tubular handling conduit and the lifting wire for at least a portion of the time period during which the pipeline is moving towards the sea floor after the performance of the step of lowering the pipeline towards the sea floor has commenced; and
   the flexible tubular handling conduit supports more of the weight of the pipeline than the lifting wire when the weight of the pipeline is supported by both the flexible tubular handling conduit and the lifting wire.

2. The method of abandonment as claimed in claim 1, further comprising the step of:
   (d) unlinking the lifting wire from the pipeline before the end of the pipeline reaches the sea floor.

3. The method of abandonment as claimed in claim 1, wherein the flexible tubular conduit and the lifting wire are linked to the pipeline via an intermediate device.

4. The method of abandonment as claimed in claim 3, wherein the intermediate device is a triplate.

5. The method of abandonment as claimed in claim 3, wherein the intermediate device is an offset triplate.

6. The method of abandonment as claimed in claim 1, wherein the lifting wire is wholly or substantially parallel to the vertical axis of the pipelaying and tensioning arrangement.

7. The method of abandonment as claimed in claim 1, wherein the lifting wire passes at least partly through the lay tower.

8. An abandonment and recovery (A&R) system comprising the method of abandoning a pipeline as defined in claim 1, and a method of recovering an abandoned pipeline on a sea floor to a pipelaying vessel, said pipeline being linked to a flexible tubular handling conduit, comprising at least the steps of:
   (i) raising the flexible tubular handling conduit and linked pipeline;
   (ii) separately linking the pipeline to a lifting wire; and
   (iii) raising the pipeline to the pipelaying vessel.

9. A pipeline laying vessel comprising the A&R system as defined in claim 8.

10. A method of recovering an abandoned pipeline on a sea floor to a pipelaying vessel, said pipeline being linked to a flexible tubular handling conduit, comprising at least the steps of:
    (i) raising the flexible tubular handling conduit and linked pipeline;
    (ii) separately linking the pipeline to a lifting wire; and
    (iii) raising the pipeline to the pipelaying vessel,
    wherein the weight of the pipeline is supported by both the flexible tubular handling conduit and the lifting wire during at least a portion of the time period during which the pipeline is moving towards the pipelaying vessel after the performance of the step of raising the pipeline to the pipelaying vessel has commenced; and
    the flexible tubular handling conduit supports more of the weight of the pipeline than the lifting wire when the weight of the pipeline is supported by both the flexible tubular handling conduit and the lifting wire.

11. The method of recovery as claimed in claim 10, wherein step (ii) is carried out prior to step (i).

12. The method of recovery as claimed in claim 10, wherein step (ii) is carried out prior to the pipeline reaching the pipelaying vessel.

13. The method of recovery as claimed in claim 10, wherein the flexible tubular handling conduit and the lifting wire are linked to the pipeline via an intermediate device.

14. The method of recovery as claimed in claim 13, wherein the intermediate device is a triplate.

15. The method of recovery as claimed in claim 10, wherein the flexible tubular handling conduit and linked pipeline are raised to the pipelaying vessel by a lay tower comprising a pipelifting arrangement, and wherein the lifting wire is wholly or substantially parallel to the vertical axis of the pipelifting arrangement, or the lifting wire passes at least partly through the lay tower, or both.

* * * * *